Figure 1:
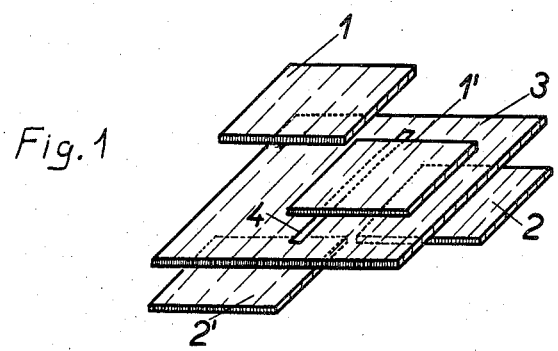

Sept. 16, 1958 E. NESVADBA 2,851,919
SHARP FOCUSING DEVICE FOR OPTICAL INSTRUMENTS
Filed Feb. 14, 1955 2 Sheets-Sheet 1

INVENTOR.
Emil Nesvadba
BY
Pierce, Scheffler & Parker
Attorneys

United States Patent Office 2,851,919
Patented Sept. 16, 1958

2,851,919

SHARP FOCUSING DEVICE FOR OPTICAL INSTRUMENTS

Emil Nesvadba, Rokytnice u Prerova, Czechoslovakia, assignor to Meopta, narodni podnik, Prerov, Czechoslovakia Application February 14, 1955, Serial No. 487,937

Claims priority, application Czechoslovakia February 18, 1954

2 Claims. (Cl. 88—1)

The subject matter of the present invention is a sharp-focusing device for optical instruments, particularly for photographic enlarging, projecting and reproducing apparatus, collimators etc. The sharp-focusing devices in optical instruments prior to this invention have been constituted by expensive inverters which functioned according to the lens equation, or by visual means and whose selection depended on the respective application.

The known visual devices are comprised of various tests, rasters, slots and similar means which are arranged in the focal plane of the objective of an optical instrument. In these sharp-focusing devices, errors are caused by the accommodation and individual shortcomings of the human eye. The precision of the sharp-focusing depends therefore, in most cases, on the individual skill of the operator and upon the conditions at the working place.

Other known sharp-focusing devices are so arranged by rasters with transparent and opaque or matt separated strip surfaces in two parallel planes, between which the focal plane is to be formed so that the two partial images are equally sharp (or nonsharp) or that the elements in the image are resolved equidistantly.

In other sharp focusing devices which consist of two diaphragms arranged in parallel planes, defocusing can be recognized by the mutual displacement of two light beams. When the focusing is correct, the two light beams coincide. The ratio of the magnitude of the displacement to the defocusing of the optical system is decisive for the precision of the focusing. When observing the mutual displacement of the light beams, the resolving power of the human eye is of importance. The resolving power should be considered at the greatest contrast, which is defined in this case by the ratio of the luminous density of the bright light beams to the luminous density of the background. The greatest contrast is obtained in the case of a black background (luminous density —0).

According to theoretical presuppositions, the defocusing $\Delta x$ of the optical system can be determined from the relation $$\Delta x = \frac{2c\Delta y'}{\beta + 1}$$

where $c$ designates the number of diaphragms, $\beta$ the enlargement and $\Delta y'$ the smallest noticeable displacement of the light beams projected in the normal visual distance.

The formula shows that the defocusing $\Delta x$ is of the same order as $\Delta y'$ (practically $10^{-2}$), so that the sensitivity of the device is quite considerable.

In these known devices the maximum precision in sharp focusing is not achieved because the two parallel planes can not be focused within the limits of the depth of focus used in the optical system, and because the focal plane does not lie exactly in the center of the depth of focus. Furthermore, the defocusing in these devices causes blur at the edge of the light beams and thus a considerable reduction of the contrast, so that it is not possible to utilize completely the resolving power of the eye.

The present invention improves the known sharp-focusing devices of this type by means of diaphragms in two parallel planes perpendicular to the optical axis and arranged such that a slit is provided between the two planes. This slit increases the marginal definition of the light beams and the contrast between the light beams and the background. Another advantage of the invention is that it can be used in precision optical instruments such as, for example, in collimators, which was not possible with the prior known devices of this type.

Figure 2:
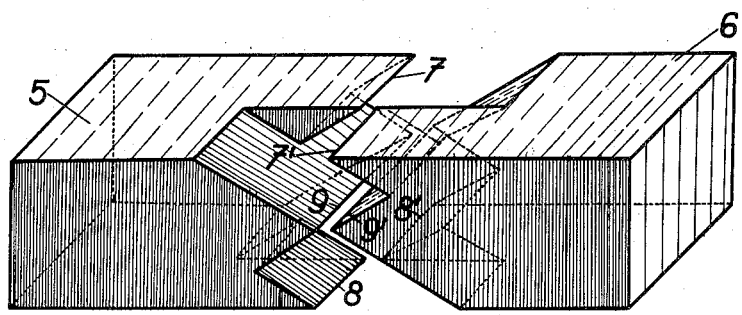
Figures 3A, 3B, 3C:
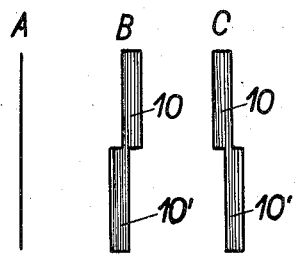
Figures 4, 5, 6:
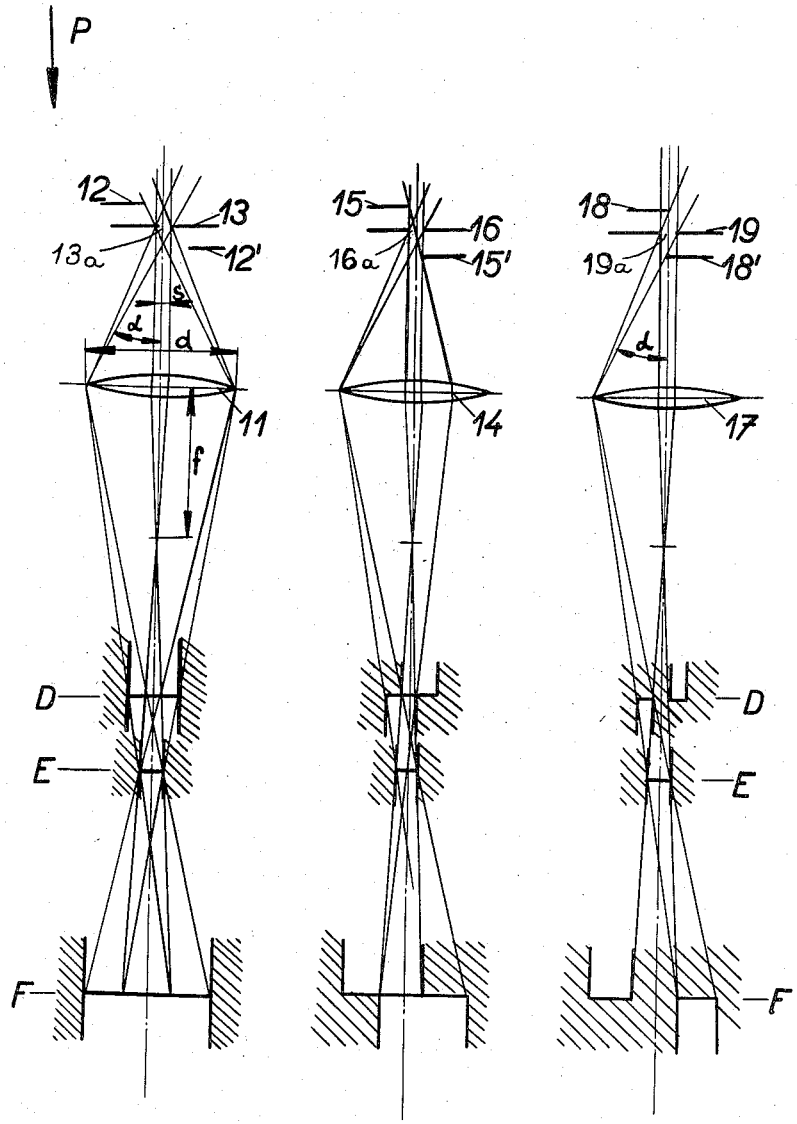

The invention is illustrated in the attached drawings. Fig. 1 shows a schematic representation of the system, which consists of two pairs of diaphragms arranged in two parallel planes and separated by a slit. Fig. 2 shows a sharp-focusing device for a photographic enlarger which consists of two prismatic bodies with edges, forming the diaphragms and the slit, in three parallel planes. Figs. 3a, 3b and 3c represent three light beams which were obtained by the sharp-focusing device according to Fig. 2. Fig. 3a shows a light beam in sharp focusing and Figs. 3b and 3c represent the light beams with defocusing of the enlarger. Fig. 4 shows the course of the light beam in the optical projection system, which uses the sharp-focusing device with the diaphragms according to the invention arranged at a distance from the optical axis. In Fig. 5 is represented a system with sharp-focusing device similar to Fig. 4 with the diaphragms at equal distance from the optical axis as slit edges. Fig. 6 shows the same optical system as Fig. 5 with sharp focusing device but with the diaphragm extending above the optical axis.

Fig. 1 illustrates the principle of the device according to the invention where the two pairs of rectangular diaphragms 1, 1' and 2, 2' are arranged in two parallel planes and with the edges of each pair parallel. Between these planes is arranged the diaphragm 3 with a slit 4 extending parallel to one edge of the diaphragms.

Another embodiment of the sharp-focusing device, specially designed for use in photographic enlargers is represented in Fig. 2. This device consists of two bodies 5, 6 of metal or plastic, whose adjoining straight sides are provided with cuts which are so arranged that they form partly two pairs of diaphragms 7, 7' or 8, 8' and partly the slit with two straight edges 9, 9'. This sharp-focusing device is secured to the negative holder of the photographic enlarger in such a way that the emulsion of the enlarged negative is found in the plance of the slit 9, 9'.

When sharp-focusing is effected by displacing the negative or the objective in the direction of the optical axis, the image of the two light beams 10, 10' is projected according to Fig. 3 to the surface of projection. Precise sharp-focusing is obtained when the two light beams 10, 10' coincide at the surface of projection in a sharp and narrow slit image Fig. 3a.

Figs. 4, 5 and 6 illustrate various sharp-focusing devices arranged in the optical projection system. In Fig. 4 it is the objective 11 and the sharp-focusing device which consists of the diaphragms 12, 12' arranged at a certain distance from the optical axis, and of the diaphragm 13 provided with a slit 13a. The light from the light source (not represented) advances in the direction of the arrow; when the slit is focused, its image appears in the plane E—E; the images of the diaphragms appear in the planes D—D and F—F. In Fig. 5 it is the objective 14 and the sharp-focusing device which consists of the diaphragms 15, 15' and whose image appears in the planes D—D and F—F, and diaphragm 16 with slit 16a.

Fig. 6 shows the objective 17 and the sharp-focusing device which consists of the diaphragms 18, 18', extending beyond the optical axis of the projection system, and of the diaphragm 19 provided with a slit 19a. When the slit is focused, its image appears in the plane E—E, and the images of the diaphragms 18, 18' in the planes D—D and F—F.

A comparison of these figures shows that Figs. 4 and 6 represent border cases of the position of the diaphragms at both sides of the slit in dependence on the focal length of the objective, its diameter and upon the enlargement. These figures also show that the device is the more sensitive the more the optical systems permits the extension of the diaphragm edges beyond the optical axis. For ordinary photographic enlargers, the embodiment according to Fig. 5 is sufficient. If necessary the embodiment with the border positions of the diaphragms as represented in Figs. 5 and 6 can be used.

It is obvious that the accuracy of the sharp-focusing will be the greater the more the diaphragm edges overlap the optical axis of the objective. The overlapping of the diaphragms, and thus the accuracy of the sharp focusing, can be increased to a certain limit only which is determined by the values of the focal length, the diameter of the entrance pupil and the enlargement of the objective. From Figs. 4, 5 and 6 one obtains for the maximum inclination $\alpha$ of the connecting line between the edges of the diaphragms and of the slit the relation:

$$tg\alpha = \frac{\beta(d+s)}{2f(\beta+1)}$$

where $\beta$ designates the enlargement, $d$ the diameter of the entrance pupil of the objective, $s$ the width of the slit and $f$ the focal length of the objective.

The sharp-focusing device according to the invention can be produced for visual type optical instruments, such as collimators, on transparent plates. The diaphragms and the slit are in this embodiment formed in an opaque layer arranged in a vacuum or in any other way.

I claim:

1. A sharp focusing device for optical instruments, said device comprising two pairs of mutually offset straight-edged diaphragms arranged respectively in two parallel planes and symmetrical with respect to the object plane, means forming a slit in said object plane, said slit lying in the common central plane of said pairs of diaphragms and said slit being parallel to the edges of said diaphragms and extending for the full length of the edges of said pairs of diaphragms, said slit and edges of said pairs of diaphragms being arranged such that a connecting line therebetween forms an angle $\alpha$ with the optical axis of the instrument up to a maximum value of $$tg\alpha = \frac{\beta(d+s)}{2f(\beta+1)}$$

wherein: $\beta$ designates the enlargement of the optical system, $d$ the diameter of the entrance pupil of the objective, $f$ the focal length of the objective, and $s$ the width of said slit.

2. A sharp-focusing device as defined in claim 1 wherein said two pairs of diaphragms and said slit are formed by the edges of cuts made in the adjoining walls of two prismatic bodies.

References Cited in the file of this patent

UNITED STATES PATENTS 2,595,495    Berg _____ May 6, 1952